I. KEY.
PAN LIFTER.
APPLICATION FILED APR. 16, 1910.
968,956.
Patented Aug. 30, 1910.
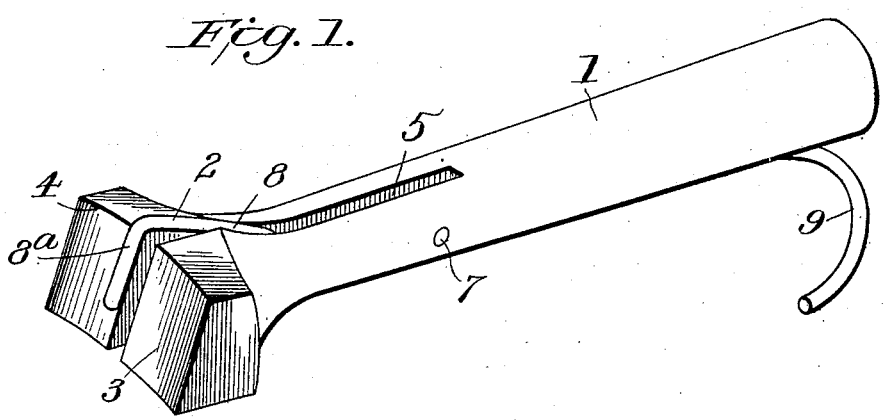
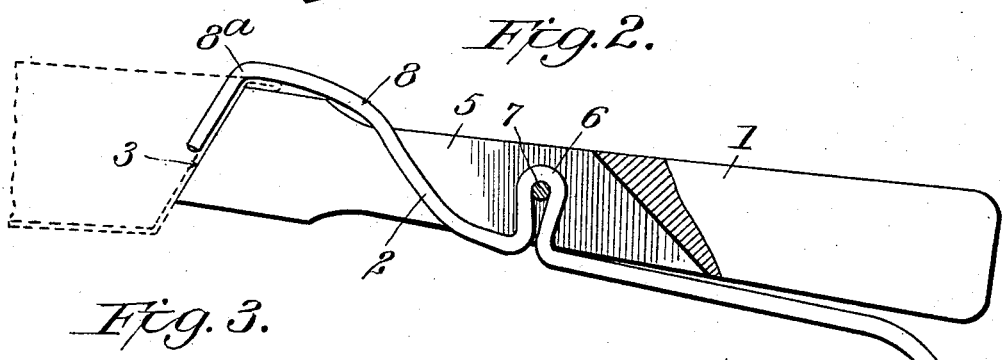
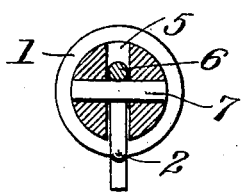
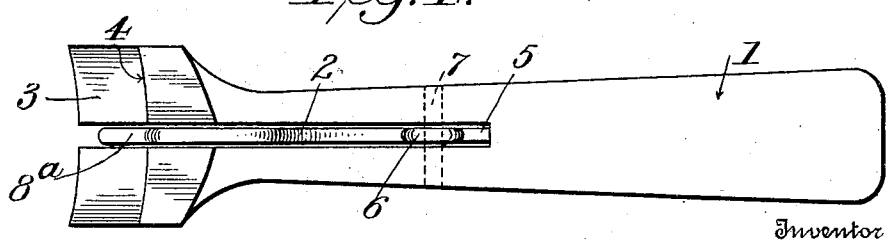
Witnesses
C. H. Walker.
Inventor
Isaac Key
By
Attorney

UNITED STATES PATENT OFFICE.

ISAAC KEY, OF FOWLERTON, INDIANA.

PAN-LIFTER.

968,956.

Specification of Letters Patent.  Patented Aug. 30, 1910.

Application filed April 16, 1910. Serial No. 555,814.

*To all whom it may concern:*

Be it known that I, ISAAC KEY, a citizen of the United States, residing at Fowlerton, in the county of Grant and State of Indiana, have invented certain new and useful Improvements in Pan-Lifters, of which the following is a specification.

My invention pertains to improvements in that class of devices which may be very appropriately termed pan-lifters.

It has for its object to provide for conveniently lifting or removing pans or culinary vessels, as from a stove, without direct contact of the hands therewith on account of heat or for sanitary reasons; also to accomplish such removal readily and easily.

The invention consists of certain instrumentalities or features substantially as hereinafter fully disclosed and defined by the claim.

In the accompanying drawing, illustrating the preferred embodiment of my invention: Figure 1 is a perspective view thereof. Fig. 2 is a broken enlarged longitudinal central section of the same, with a fractional showing in dotted lines of a pan, to which the invention or device is applied as in lifting or removing the pan. Fig. 3 is a transverse section produced through Fig. 1, contiguous to the fulcrum of the lever-member of the device. Fig. 4 is a plan view of the device.

In carrying out my invention, I employ a handle member 1 and a lever-member 2, suitably assembled for co-action, as next described. The lifter-member is preferably of a "turned" piece of wood, or malleable metal, suitably adapted for convenient grasping by the hand, the same having its forward end, 3, preferably rectangular faced. Said forward end-portion 3 has its forwardly facing surface or portion produced at an obtuse angle to the plane of the upper surface thereof and with a horizontal arcuate outline as at 4, conforming or corresponding to an arc and the inclination of the rim of the pan to enable said end-portion to abut solidly against the pan rim upon its outside, thus also serving in the capacity of a jaw. Said handle-member is slotted or bifurcated longitudinally as at 5, the slot or bifurcation 5 extending from a point near its midlength to, and dividing its arcuate or curved end-portion or jaw 3, for a purpose presently apparent.

The lever-member 2 is arranged in the direction of the length of the member 1 and fulcrumed in the slot 5, being preferably formed, intermediate its ends, with a loop or eye 6 receiving a pivoting pin 7 extending transversely through said slot and fixed in said handle-member 1. Said lever-member is adapted at its forward end to occupy a position above the end or jaw 3 of the member 1 and, in addition to being upwardly bent or offset as at 8 to cause it to assume such position, is also formed forwardly of said offset with a right-angled terminal, as at $8^a$, the vertical arm of the angle being adapted to stand in front of, and slightly off from the arcuate face of the jaw 3, for gripping the inner surface of the pan-rim when pressure is applied to the lever-member, as presently explained. The opposite end-portion of the lever-member is adapted to occupy a position below said member 1 and suitably curved, or of hook-like formation, as at 9, for the ready and effective engagement therewith of the hand, or a finger, while at the same time grasping the member 1, to put the lever-member under pressure, as in causing the forward end 8 of the lever-member to grip the inner surface of the pan rim interposed therebetween and the jaw 3, as above indicated, thus also providing for the simultaneous gripping of the outer surface of the pan-rim by said jaw, and allowing of the lifting or removing of the pan by suitably manipulating the handle member 1, as will be readily understood.

This device is exceedingly simple, inexpensive and effective in action, and provides, as already noted, for conveniently and quickly effecting the lifting of the object, or pan, or culinary utensil.

I claim:

A pan-lifter of the character described, comprising a solid handle-member having a headed jaw, said jaw having a slotted cylindrical face, a pivot-pin in said slot, and a lever member arranged in said slot and having intermediate its ends a loop receiving said pivot-pin, said lever-member having an upwardly offset portion forward of its fulcrum and a depending finger beyond said offset portion, adapted to coact with said cylindrical face for gripping the rim of the pan, the rear end portion of said lever member being arranged below the rear end of said handle-member and adapted to be engaged by the hand.

In testimony whereof I affix my signature in presence of two witnesses.

ISAAC KEY.

Witnesses:
F. M. HARDESTY,
W. D. DYE.